United States Patent
Sun et al.

(10) Patent No.: US 12,332,041 B2
(45) Date of Patent: Jun. 17, 2025

(54) HETERODYNE FIBER INTERFEROMETER DISPLACEMENT MEASURING SYSTEM AND METHOD

(71) Applicants: BEIJING U-PRECISION TECH CO., LTD., Beijing (CN); Beijing United Victory Precision Technology Co., Ltd., Beijing (CN)

(72) Inventors: Guohua Sun, Beijing (CN); Zhaokui Cheng, Beijing (CN); Shengli Guo, Beijing (CN)

(73) Assignees: BEIJING U-PRECISION TECH CO., LTD., Beijing (CN); Beijing United Victory Precision Technology Co., Ltd., Beijing (CN)

( * ) Notice: Subject to any disclaimer, the term of this patent is extended or adjusted under 35 U.S.C. 154(b) by 215 days.

(21) Appl. No.: 18/037,664

(22) PCT Filed: Oct. 22, 2021

(86) PCT No.: PCT/CN2021/125621
§ 371 (c)(1),
(2) Date: May 18, 2023

(87) PCT Pub. No.: WO2022/105532
PCT Pub. Date: May 27, 2022

(65) Prior Publication Data
US 2023/0408250 A1    Dec. 21, 2023

(30) Foreign Application Priority Data
Nov. 18, 2020    (CN) .......................... 202011297064.4

(51) Int. Cl.
*G01B 11/02*    (2006.01)
*G01B 9/02002*    (2022.01)

(52) U.S. Cl.
CPC .......... *G01B 11/02* (2013.01); *G01B 9/02002* (2013.01); *G01B 2290/45* (2013.01); *G01B 2290/70* (2013.01)

(58) Field of Classification Search
CPC ................ G01B 11/02; G01B 2290/45; G01B 2290/70; G01B 9/02002
(Continued)

(56) References Cited

U.S. PATENT DOCUMENTS

| 5,402,230 A | 3/1995 | Tian et al. |
| 2003/0197869 A1 | 10/2003 | Johnstone et al. |

(Continued)

FOREIGN PATENT DOCUMENTS

| CN | 101825435 A | 9/2010 |
| CN | 102944176 A | 2/2013 |

(Continued)

OTHER PUBLICATIONS

International Search Report from International Application No. PCT/CN2021/125621 mailed Jan. 26, 2022.

*Primary Examiner* — Sunghee Y Gray
(74) *Attorney, Agent, or Firm* — Shih IP Law Group, PLLC (57) ABSTRACT

A heterodyne fiber interferometer displacement measuring system, including a laser light source assembly for simultaneously emitting measuring light and reference light; a first photoelectric detector, a first fiber coupler, a fiber ferrule, a plano-convex lens, a first polarizing beam splitting prism, and a first reflecting device which are sequentially provided on an optical path of the measuring light on the basis of first single mode fibers; and a second photoelectric detector, a second fiber coupler, a collimator, a second polarizing beam splitting prism, and a second reflecting device which are sequentially provided on an optical path of (Continued)

the reference light on the basis of second single mode fibers. An object to be measured is fixed on the first reflecting device, the reference light and the measuring light are processed to form measurement and reference signals, and displacement information of the object is determined according to the measurement reference signals.

10 Claims, 4 Drawing Sheets

(58) Field of Classification Search
USPC .......................................................... 356/487
See application file for complete search history.

(56) References Cited

U.S. PATENT DOCUMENTS

| | | | |
|---|---|---|---|
| 2011/0249270 A1 | 10/2011 | Ishizuka | |
| 2016/0178345 A1* | 6/2016 | Kilpatrick | G01B 11/14 |
| | | | 356/482 |

FOREIGN PATENT DOCUMENTS

| | | |
|---|---|---|
| CN | 103307986 A | 9/2013 |
| CN | 105698702 A | 6/2016 |
| CN | 106289068 A | 1/2017 |
| CN | 108592800 A | 9/2018 |
| CN | 209148138 U | 7/2019 |
| CN | 110456533 A | 11/2019 |
| CN | 111679441 A | 9/2020 |
| CN | 112484648 A | 3/2021 |

* cited by examiner

HETERODYNE FIBER INTERFEROMETER DISPLACEMENT MEASURING SYSTEM AND METHOD

TECHNICAL FIELD

The present disclosure relates to the technical field of precision displacement measurement, and more specifically, to a heterodyne fiber interferometer displacement measuring system and method.

DESCRIPTION OF RELATED ART

Precision measurement is the basis of precision processing, especially for IC equipment, nanoscale or even sub-nanoscale resolution has become a standard and requirement for precision measurement. At present, as research objects for precision measurement, laser interferometer and grating interferometer have increasingly high requirements for their resolution. Existing commercial interferometers, such as fiber-coupled interferometers, can achieve nanoscale accuracy and a wider range of applications. However, in an actual measurement process, dead range error, thermal drift error and fiber optic transmission error may significantly reduce the measurement accuracy of the interferometer.

In addition, in an actual displacement measurement process, due to factors such as movement of an object, a grating or mirror may produce a small rotation angle, which may deteriorate the signal quality of the reflected light and introduce errors. A way to solve this problem is to change the angled beam into a parallel beam by using optical elements, but there is still a situation of spot separation. Due to the spot separation, the size of the spot needs to be increased in a usage scenario of long stroke measurement. Compared with a small spot, a large spot not only reduces the measuring angle range, but also deteriorates the wavefront quality of beam.

In view of the above problems, patents U.S. Pat. Nos. 6,020,964A and 6,980,279B2 both disclose that a corner prism is used to reflect light so that the light having entered into the corner prism is parallel to the outgoing light; even if environmental factors such as vibration cause a small rotation angle in the mirror, it can also ensure that the final reflected light is parallel to the incident light; however, such arrangement leads to a large overall structure of the interferometer, and when the measurement stroke is too large, the spot separation may occur. Further, patent U.S. Pat. No. 6,897,962B2 discloses an eight-fold subdivision interferometer, where the spot separation may also occur, but two light spots can always overlap in the measurement stroke by enlarging the light spots. However, large spots also have certain problems, for example, when the air is disturbed, the refractive index of the air may become unstable, so that the wavefront of the spot may become disordered, the quality of signal may deteriorate, and errors of dead range and temperature drift may also increase.

SUMMARY

In view of the above, an object of the present disclosure is to provide a heterodyne fiber interferometer displacement measuring system and method to solve the problems of large size, poor detection quality, and low accuracy existing in current interferometers.

The heterodyne fiber interferometer displacement measuring system includes a laser light source assembly configured to simultaneously emit a measuring light and a reference light; a first photoelectric detector, a first fiber coupler, a fiber ferrule, a plano-convex lens, a first polarizing beam splitting prism, and a first reflecting device which are sequentially provided on an optical path of the measuring light on the basis of first single mode fibers; and a second photoelectric detector, a second fiber coupler, a collimator, a second polarizing beam splitting prism, and a second reflecting device which are sequentially provided on an optical path of the reference light on the basis of second single mode fibers; wherein an object to be measured is fixed on the first reflecting device, wherein the measuring light sequentially passes through the fiber ferrule, the plano-convex lens and the first polarizing beam splitting prism to form two beams of light, one of which is fed back to the first fiber coupler via the first reflecting device, the first polarizing beam splitting prism, the plano-convex lens, the fiber ferrule and the first single mode fibers, and the other of which is fed back to second fiber coupler via the second polarizing beam splitting prism, the collimator and the second single mode fibers; wherein the reference light sequentially passes through the collimator and the second polarizing beam splitting prism to form two beams of light, one of which is fed back to the second fiber coupler via the second reflecting device, the second polarizing beam splitting prism, the collimator and the second single mode fibers, and the other of which is fed back to the first fiber coupler via the first polarizing beam splitting prism, the plano-convex lens and the first single mode fibers; wherein the first fiber coupler couples the processed measuring light and reference light to the first photoelectric detector to form a measurement signal; the second fiber coupler couples the processed reference light and measuring light to the second photoelectric detector to form a reference signal; and wherein displacement information of the object is determined according to the measurement signal and the reference signal.

Further, preferably, the laser light source assembly includes a single-frequency laser, an fiber beam splitter connected to the single-frequency laser, and a first acousto-optic modulator and a second acousto-optic modulator connected to the fiber beam splitter, wherein a light beam emitted by the single-frequency laser passes through the fiber beam splitter to form two beams of light, one of which is frequency-shifted by the first acousto-optic modulator to form the measuring light, and the other of which is frequency-shifted by the second acousto-optic modulator to form the reference light.

Further, preferably, the laser light source assembly includes a first laser emitter and a second laser emitter, the first laser emitter emits the measuring light, and the second laser emitter emits the reference light having the same frequency as the measuring light.

Further, preferably, the reference light passes through the second single mode fibers and is processed by the collimator to form a first linearly polarized light with a polarization angle of 45°; the first linearly polarized light passes through the second polarizing beam splitting prism to form a first P light and a first S light; the first P light is projected to the second reflecting device, and returns to the collimator and the second single mode fibers; the first S light is reflected to the first polarizing beam splitting prism and then converged by the plano-convex lens to the first single mode fiber.

Further, preferably, the measuring light passes through the first single mode fibers and then passes through the plano-convex lens to form a second linearly polarized light with a polarization angle of 45°; the second linearly polarized light passes through the first polarizing beam splitting prism and then forms a second P light and a second S light; the second S light is reflected to the second polarizing beam splitting prism and then enters the second single mode fibers through the collimator; a projected light bean (1.1) of the second P light reaches the first reflecting device, and then a reflected light beam (1.2) is projected to an end surface of the fiber ferrule after passing through the plano-convex lens, and then reflected to the plano-convex lens; a light beam (1.3) having passed through the plano-convex lens is parallel to the light beam (1.2), and a light beam (1.4) obtained by reflecting the light beam (1.3) by the first reflecting device is parallel to the light beam (1.1); the light beam (1.4) is converged into the first single mode fiber after passing through the plano-convex lens.

Further, preferably, the light beam (1.4) and the first S light having entered the first single mode fibers are transmitted to the first fiber coupler, and are coupled to the first photoelectric detector through the first fiber coupler, the first photoelectric detector forms the measurement signal according to the processed measuring light and reference light; the second S light and the first P light having entered the second single mode fibers are transmitted to the second fiber coupler, and are coupled to the second photoelectric detector through the second fiber coupler, the second photoelectric detector forms the reference signal according to the processed measuring light and reference light.

Further, preferably, the displacement information of the first reflecting device is expressed by a formula as below:

$$\Delta z = \frac{\lambda(\varphi_1 - \varphi_2)}{2\pi \times 2\left(1 + \frac{1}{\cos\theta}\right)}$$

wherein $\Delta z$ represents the displacement information, $\lambda$ represents a wavelength of the light beam in the air, $\varphi_1$ represents a discriminated phase with the measurement signal, $\varphi_2$ represents a discriminated phase with the reference signal, and $\theta$ represents an installation angle of the first reflecting device relative to a y-axis direction.

Further, preferably, the discriminated phase with the reference signal is formed based on a perturbation error of the first single mode fibers and the second single mode fibers; the perturbation error is removed by a subtraction method.

Further, preferably, the first reflecting device is a mirror or a grating.

According to another aspect, the present disclosure provides a heterodyne fiber interferometer displacement measuring method, in which the above-mentioned heterodyne fiber interferometer displacement measuring system is used to measure the displacement of the object to be measured; the method includes: sequentially passing the measuring light through the fiber ferrule, the plano-convex lens and the first polarizing beam splitting prism to form two beams of light, one of which is fed back to the first fiber coupler via the first reflecting device, the first polarizing beam splitting prism, the plano-convex lens, the fiber ferrule and the first single mode fibers, and the other of which is fed back to second fiber coupler via the second polarizing beam splitting prism, the collimator and the second single mode fibers; sequentially passing the reference light through the collimator and the second polarizing beam splitting prism to form two beams of light, one of which is fed back to the second fiber coupler via the second reflecting device, the second polarizing beam splitting prism, the collimator and the second single mode fibers, and the other of which is fed back to the first fiber coupler via the first polarizing beam splitting prism, the plano-convex lens and the first single mode fibers; coupling the processed measuring light and reference light to the first photoelectric detector by the first fiber coupler to form a measurement signal; coupling the processed reference light and measuring light to the second photoelectric detector by the second fiber coupler to form a reference signal; and determining displacement information of the object according to the measurement signal and the reference signal.

According to the heterodyne fiber interferometer displacement measuring system and method, the present disclosure has the advantages of insensitivity to the environment, high measurement accuracy, small size, light weight, large measurement range of rotation angle and large measurement stroke, and the comprehensive performance of a position measuring system for ultra-precision workpiece stage of lithography machine can be improved.

In order to achieve the above and related objects, one or more aspects of the present disclosure include features hereinafter described in detail. The following description and accompanying drawings provide a detailed explanation of certain exemplary aspects of the present disclosure. However, these aspects only indicate some of the various ways in which the principles of the present disclosure may be employed. Furthermore, the present disclosure is intended to include all such aspects and their equivalents.

BRIEF DESCRIPTION OF DRAWINGS

Other objects and results of the present disclosure will become apparent and easy to understand by referring to the following description in conjunction with the accompanying drawings and with a more comprehensive understanding of the present disclosure. In the drawings.

Reference numerals are as follows: laser light source assembly 10, single-frequency laser 10.1, fiber beam splitter 10.2, first acousto-optic modulator 10.3, second acousto-optic modulator 10.4, first photoelectric detector 20, second photoelectric detector 21, first fiber coupler 31, second fiber coupler 30, first single mode fiber 41, first single mode fiber 43, cladding 43.2, fiber core 43.1, second single mode fiber 40, second single mode fiber 42, fiber ferrule 50, collimator 60, plano-convex lens 70, first polarizing beam splitting prism 81, second polarizing beam splitting prism 80, second reflecting device 90, first reflecting device 100, grating 110, wavelength modulator 120.

The same reference numerals indicate similar or corresponding features or functions throughout the drawings.

DETAILED DESCRIPTIONS

In the following description, for purposes of explanation, many specific details are set forth in order to provide a thorough understanding of one or more embodiments. However, it is obvious that these embodiments may be practiced without these specific details. In other examples, well-known structures and devices are shown in block diagram form in order to facilitate describing one or more embodiments.

In order to describe the heterodyne fiber interferometer displacement measuring system and method of the present disclosure in detail, specific embodiments of the present disclosure will be described in detail below in conjunction with the accompanying drawings.

Figure 1:
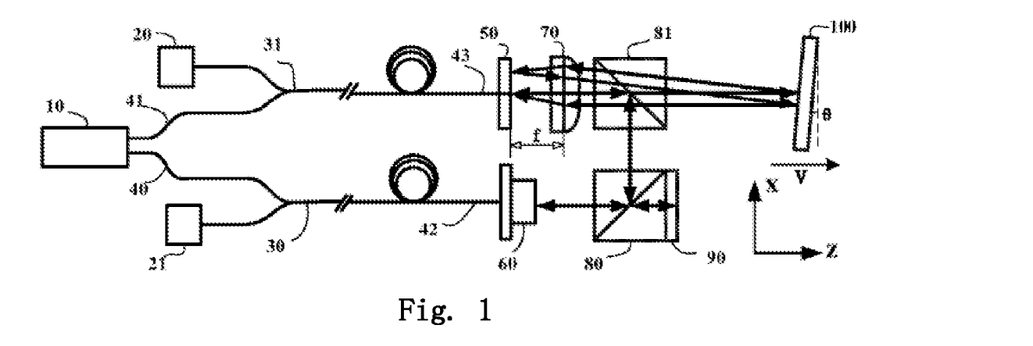
FIG. 1 is a logic diagram of a heterodyne fiber interferometer displacement measuring system according to an embodiment of the present disclosure.

FIG. 1 shows the logic of a heterodyne fiber interferometer displacement measuring system according to an embodiment of the present disclosure.

As shown in FIG. 1, the heterodyne fiber interferometer displacement measuring system according to an embodiment of the present disclosure includes a laser light source assembly 10 configured to simultaneously emit a measuring light and a reference light; a first photoelectric detector 20, a first fiber coupler 31, a fiber ferrule 50, a plano-convex lens 70, a first polarizing beam splitting prism 81, and a first reflecting device 100 which are sequentially provided on an optical path of the measuring light on the basis of first single mode fibers (41, 43); and a second photoelectric detector 21, a second fiber coupler 30, a collimator 60, a second polarizing beam splitting prism 80, and a second reflecting device 90 which are sequentially provided on an optical path of the reference light on the basis of second single mode fibers (40, 42); wherein an object to be measured is fixed on the first reflecting device 100.

Here, the measuring light sequentially passes through the fiber ferrule 50, the plano-convex lens 70 and the first polarizing beam splitting prism 81 to form two beams of light, one of which is fed back to the first fiber coupler 31 via the first reflecting device 100, the first polarizing beam splitting prism 81, the plano-convex lens 70, the fiber ferrule 50 and the first single mode fibers (41, 43), and the other of which is fed back to second fiber coupler 30 via the second polarizing beam splitting prism 80, the collimator 60 and the second single mode fibers (40, 42); wherein a distance between the plano-convex lens 70 and an end surface of the fiber ferrule 50 is a focal length f of the plano-convex lens 70.

Here, the reference light sequentially passes through the collimator 60 and the second polarizing beam splitting prism 80 to form two beams of light, one of which is fed back to the second fiber coupler 30 via the second reflecting device 90, the second polarizing beam splitting prism 80, the collimator 60 and the second single mode fibers (40, 42), and the other of which is fed back to the first fiber coupler 31 via the first polarizing beam splitting prism 81, the plano-convex lens 70 and the first single mode fibers (41, 43).

The first fiber coupler 31 couples the processed measuring light and reference light to the first photoelectric detector 20 to form a measurement signal; the second fiber coupler 30 couples the processed reference light and measuring light to the second photoelectric detector 21 to form a reference signal; and finally, displacement information of the object to be measured is determined according to the measurement signal and the reference signal.

Figure 2:
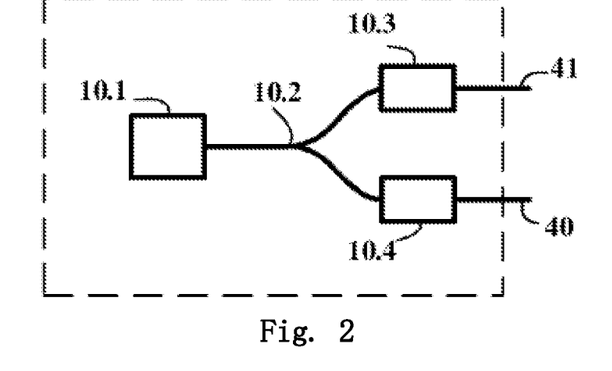
FIG. 2 is a schematic structural diagram of a laser light source assembly according to an embodiment of the present disclosure.

FIG. 2 shows a schematic structure of a laser light source assembly according to an embodiment of the present disclosure.

As shown in FIGS. 1 and 2, the laser light source assembly 10 according to an embodiment of the present disclosure includes a single-frequency laser 10.1, an fiber beam splitter 10.2 connected to the single-frequency laser 10.1, and a first acousto-optic modulator 10.3 and a second acousto-optic modulator 10.4 connected to the fiber beam splitter 10.2, wherein a light beam emitted by the single-frequency laser 10.1 passes through the fiber beam splitter 10.2 to form two beams of light, one of which is frequency-shifted by the first acousto-optic modulator 10.3 to form the measuring light and is transmitted through the first single mode fiber 41, and the other of which is frequency-shifted by the second acousto-optic modulator 10.4 to form the reference light and is transmitted through the second single mode fiber 40.

In addition, the laser light source assembly 10 is not limited to the specific structure shown in FIG. 2. For example, the laser light source assembly may include a first laser emitter and a second laser emitter, wherein the first laser emitter emits the measuring light, and the second laser emitter emits the reference light having the same frequency as the measuring light. That is, the laser light source assembly changed into a device capable of simultaneously emitting two beams of light at the same frequency, and an orthogonal detection for phase discrimination of the two beams of light can be realized by using wavelength modulation. At this time, the heterodyne fiber interferometer displacement measuring system according to the embodiment of the present disclosure can be applied to a homodyne interferometer measuring system.

Figure 3:
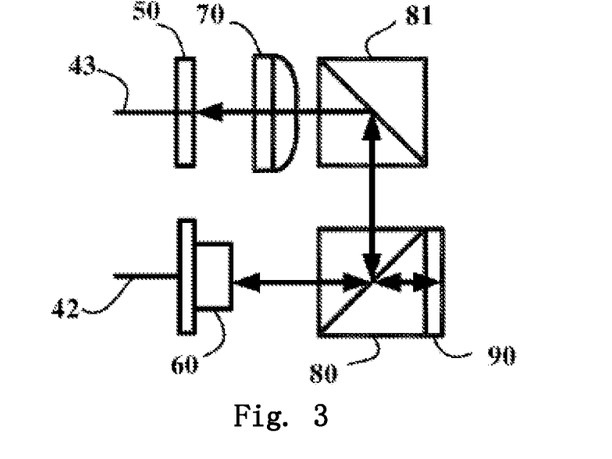
FIG. 3 is a schematic diagram of an optical path of measuring light according to an embodiment of the present disclosure.

FIG. 3 shows a schematic optical path of the measuring light according to an embodiment of the present disclosure.

Figure 5:
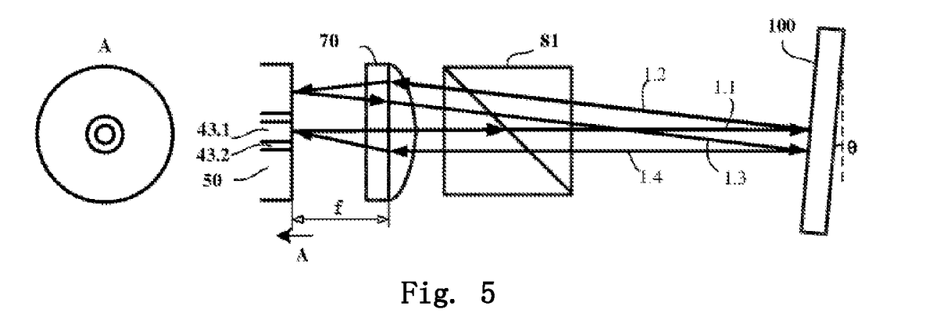
FIG. 5 is a schematic diagram illustrating that a rotation angle is eliminated according to an embodiment of the present disclosure.

As shown in FIG. 3, in the heterodyne fiber interferometer displacement measuring system according to the embodiment of the present disclosure, the reference light passes through the second single mode fibers and is processed by the collimator 60 to form a first linearly polarized light with a polarization angle of 45°; the first linearly polarized light is processed by the second polarizing beam splitting prism 80 to form a first P light and a first S light; the first P light is projected to the second reflecting device 90, returns to the collimator 60 after passing through the second reflecting device 90 and then is coupled into the second single mode fibers; the first S light is reflected to the first polarizing beam splitting prism 81 and then converged by the plano-convex lens 70 to the first single mode fiber (converged to a fiber core 43.1 in FIG. 5 and enters into the first single mode fiber).

Figure 4:
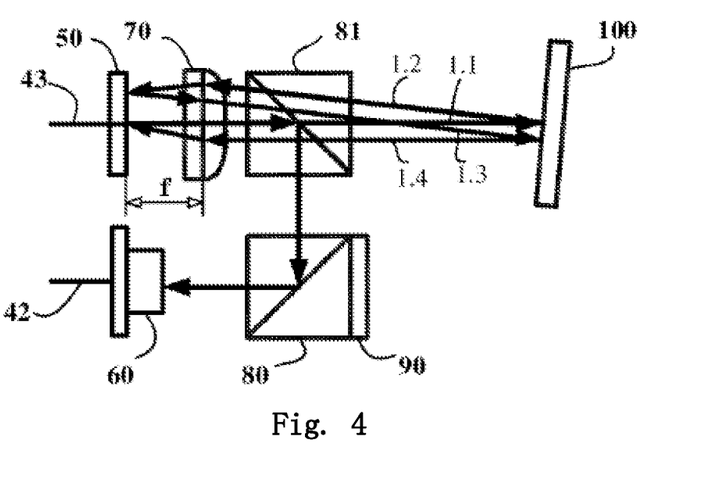
FIG. 4 is a schematic diagram of an optical path of reference light according to an embodiment of the present disclosure.

FIG. 4 shows a schematic optical path of the reference light according to an embodiment of the present disclosure.

As shown in FIG. 4, in the heterodyne fiber interferometer displacement measuring system according to the embodiment of the present disclosure, the measuring light passes through the first single mode fibers and then passes through the plano-convex lens 70 to form a second linearly polarized light with a polarization angle of 45°; the second linearly polarized light passes through the first polarizing beam splitting prism 81 and then forms a second P light and a second S light; the second S light is reflected to the second polarizing beam splitting prism 80 and then enters the second single mode fibers through the collimator; a projected light bean 1.1 of the second P light reaches the first reflecting device 100, and then a reflected light beam 1.2 is projected to an end surface of the fiber ferrule 50 after passing through the plano-convex lens 70 and then reflected to the plano-convex lens 70; a light beam 1.3 having passed through the plano-convex lens 70 is parallel to the light beam 1.2, and a light beam 1.4 obtained by reflecting the light beam 1.3 through the first reflecting device 100 is parallel to the light beam 1.1; the light beam 1.4 is converged into the first single mode fiber (into the fiber core 43.1 in FIG. 5 and into the first single mode fiber) after passing through the plano-convex lens 70.

Further, the light beam 1.4 and the first S light having entered the first single mode fibers are transmitted to the first fiber coupler 31, and are coupled to the first photoelectric detector 20 through the first fiber coupler 31, and the first photoelectric detector 20 forms the measurement signal according to the processed measuring light and reference light; the second S light and the first P light having entered the second single mode fibers are transmitted to the second fiber coupler 30, and are coupled to the second photoelectric detector 21 through the second fiber coupler 30, and the second photoelectric detector 21 forms the reference signal according to the processed measuring light and reference light.

FIG. 5 shows a schematic structure illustrating the installation of the fiber ferrule and the elimination of rotation angle according to an embodiment of the present disclosure.

As shown in FIG. 5, in the heterodyne fiber interferometer displacement measuring system according to the embodiment of the present disclosure, the fiber ferrule 50 is a specially processed part, and the fiber ferrule 50 is provided in a ring shape as can be seen in the A direction; the fiber ferrule 50 is plated with a reflective film on an end surface thereof, and is installed at an end of the first single mode fiber 43; the first single mode fiber 43 includes a cladding 43.2 and a fiber core 43.1; an inner hole of the fiber ferrule 50 fits with the cladding 43.2 of the first single mode fiber, and the end surface of the fiber ferrule 50 is installed on a focal plane of the plano-convex lens 70; it can be seen from the optical path of the measuring light that after the second P light passes through the first polarizing beam splitting prism 81, the light beam 1.2 obtained by reflecting the light beam 1.1 by the first reflecting device 100 is projected to the end surface of the fiber ferrule 50 (i.e. a certain point on the focal plane) after passing through the plano-convex lens 70, and then reflected to the plano-convex lens 70; a light beam 1.3 having passed through the plano-convex lens 70 is parallel to the light beam 1.2, and a light beam 1.4 having passed through the first reflecting device 100 is parallel to the light beam 1.1; then, the light beam 1.4 may be converged by the plano-convex lens 70 to the position from which the light beam 1.1 is emitted, that is, to the fiber core 43.1; when the installation angle θ varies by ±Δθ, it is always guaranteed that the reflected light beam can return to the fiber core 43.1.

It can be seen that the above-mentioned installation angle mainly refers to an angle between the first reflecting device 100 and the y-axis direction (vertical direction). Since the object to be detected is fixed on the first reflecting device 100, the position adjustment of the object to be detected can be realized by adjusting the angle of the first reflecting device 100.

As shown in FIGS. 1 to 5, the first reflecting device 100 moves in one dimension along with the object to be detected while maintaining a fixed installation angle θ. When the object drives, as it moves, the first reflecting device 100 to move, a displacement-related phase shift $\alpha_1$ is introduced into the light beam 1.4 by the Doppler effect, an error phase shift $\alpha_2$ is introduced due to the disturbance of the first single mode fiber 43, and an error phase shift $\alpha_3$ is introduced by the second single mode fiber 42. It can be seen from FIGS. 1-3 that the measuring light and reference light having entered the first single mode fiber 43 are transmitted to the first fiber coupler 31, and then transmitted to the first photoelectric detector 20 through the first fiber to form a measurement signal, and the measuring light and reference light having entered the second single mode fiber 42 are transmitted to the second fiber coupler 30, and then transmitted to the second photoelectric detector 21 through the second fiber to form a reference signal.

Here, the result of the phase discrimination with the measurement signal is $\varphi_1=\alpha_1+\alpha_2-\alpha_3$. Here, the result of the phase discrimination with the reference signal is $\varphi_2=\alpha_2-\alpha_3$. Therefore, the final displacement of the object to be detected (i.e., the displacement information of the first reflecting device) is expressed by a formula as below:

$$\Delta z = \frac{\lambda(\varphi_1 - \varphi_2)}{2\pi \times 2\left(1 + \frac{1}{\cos\theta}\right)}$$

wherein, $\Delta z$ represents the displacement information, $\lambda$ represents a wavelength of the light beam in the air, $\varphi_1$ represents a discriminated phase with the measurement signal, $\varphi_2$ represents a discriminated phase with the reference signal, and θ represents an installation angle of the first reflecting device relative to the y-axis direction. In addition, since the discriminated phase with the reference signal is formed based on a perturbation error of the second single mode fibers, the perturbation error may be removed by a subtraction method.

It can be seen that the heterodyne fiber interferometer displacement measuring system provided by the present disclosure can solve the problems of spot separation and fringe contrast attenuation caused by the rotation angle of the object to be detected. Due to the spot separation, measuring the spot requires a certain size, but the present disclosure does not have this spot separation issue and enables smaller spot size measurement, and thus less error due to air turbulence.

In a specific embodiment of the present disclosure, since the installation of the first reflecting device 100 needs to maintain a fixed angle θ to ensure that the light beam 1.2 can be projected to the fiber ferrule; when the angle θ tends to zero, the light beam 1.2 may be directly converged on the first single mode fiber 43, so that the heterodyne fiber interferometer displacement measuring system changes from four subdivisions to two subdivisions, and at this time, the system no longer has the property of eliminating the spot separation caused by the rotation angle; therefore, whether the angle θ is suitable can be determined by the measurement result of the four subdivisions.

In addition, the first reflecting device 100 may be a mirror or a grating. In the above embodiments, the first reflecting device is described by taking a mirror as an example. It can be seen that when the first reflecting device is a grating, the effect of displacement measurement can also be achieved.

Figure 6:
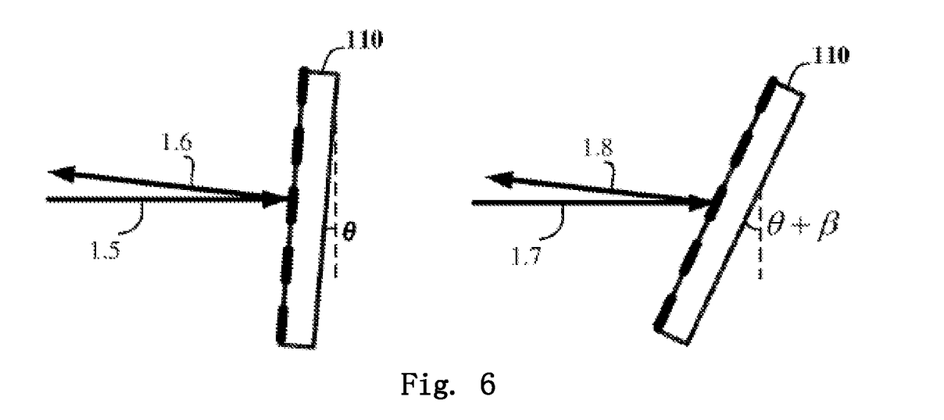
FIG. 6 is a schematic diagram of a grating according to an embodiment of the present disclosure.

FIG. 6 shows a schematic structure in which the first reflecting device is replaced by a grating according to an embodiment of the present disclosure.

As shown in FIG. 6, in the heterodyne fiber interferometer displacement measuring system of the present disclosure, the first reflecting device 100 adopts a grating 110 to diffract the reflected light; furthermore, when the incident light is perpendicular to a plane of the grating 110, a 0th order diffracted light returns back along an original path, and when the incident light enters the grating 110 at a Littrow angle β, a +1st or −1st order diffracted light returns back along the original path. Here, the Littrow angle β=arcsin(λ/2p), wherein λ is a laser wavelength, p is a pitch of the grating. In the former form, the grating 110 is rotated by a certain angle θ, a light beam 1.5 is incident onto the grating 110 and then a 0th order diffracted light beam 1.6 returns back. In the latter form, the grating 110 is rotated by a certain angle θ+β, a light beam 1.7 is incident onto the grating 110 and then a +1st or −1st order diffracted light beam 1.8 returns back.

It can be seen that the heterodyne fiber interferometer displacement measuring system of the present disclosure can also be applied to a grating interferometer.

Figure 7:
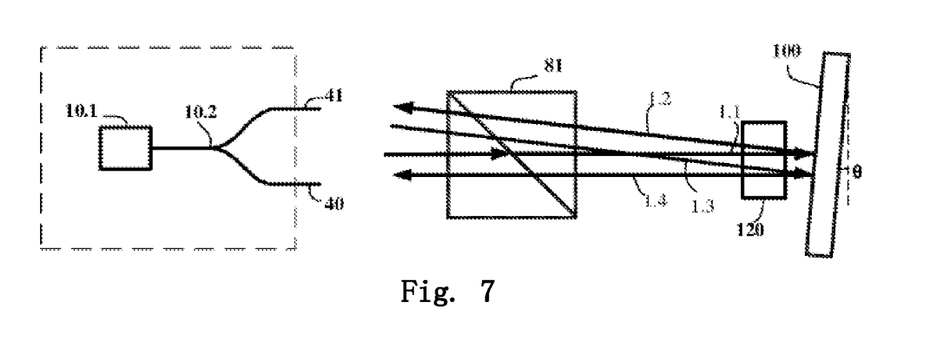
FIG. 7 is a schematic structural diagram of a homodyne interferometer according to an embodiment of the present disclosure.

FIG. 7 shows a schematic structure of a homodyne interferometer according to an embodiment of the present disclosure.

As shown in FIG. 7, the acousto-optic modulators 10.3 and 10.4 in the laser light source assembly 10 are removed, and the measuring light and the reference light are linearly polarized light of the same frequency. The entire measuring system can be changed into a homodyne interferometer measuring system, but in terms of phase discrimination, it is necessary to add a wavelength modulator 120 in front of the first reflecting device 100 to modulate the phase of the measuring light so as to achieve orthogonal phase discrimination.

Corresponding to the above-mentioned heterodyne fiber interferometer displacement measuring system, the present disclosure also provides a heterodyne fiber interferometer displacement measuring method, in which the above-mentioned heterodyne fiber interferometer displacement measuring system is used to measure the displacement of the object to be measured.

Figure 8:
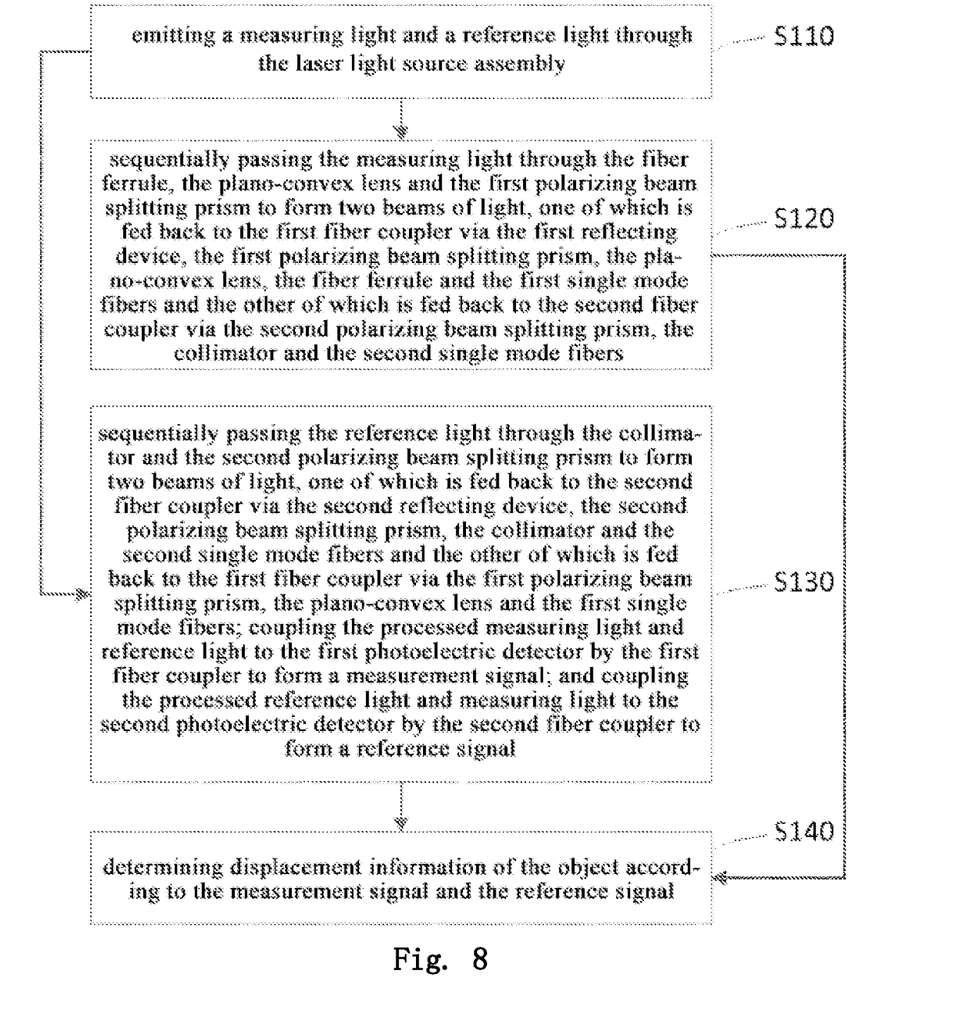
FIG. 8 is a schematic flowchart of a heterodyne fiber interferometer displacement measuring method according to an embodiment of the present disclosure.

FIG. 8 shows the flowchart of the heterodyne fiber interferometer displacement measuring method according to an embodiment of the present disclosure.

As shown in FIG. 8, the heterodyne fiber interferometer displacement measuring method according to an embodiment of the present disclosure includes:

emitting a measuring light and a reference light through the laser light source assembly;

sequentially passing the measuring light through the fiber ferrule, the plano-convex lens and the first polarizing beam splitting prism to form two beams of light, one of which is fed back to the first fiber coupler via the first reflecting device, the first polarizing beam splitting prism, the plano-convex lens, the fiber ferrule and the first single mode fibers, and the other of which is fed back to the second fiber coupler via the second polarizing beam splitting prism, the collimator and the second single mode fibers, and at the same time, sequentially passing the reference light through the collimator and the second polarizing beam splitting prism to form two beams of light, one of which is fed back to the second fiber coupler via the second reflecting device, the second polarizing beam splitting prism, the collimator and the second single mode fibers and the other of which is fed back to the first fiber coupler via the first polarizing beam splitting prism, the plano-convex lens and the first single mode fibers; coupling the processed measuring light and reference light to the first photoelectric detector by the first fiber coupler to form a measurement signal; and coupling the processed reference light and measuring light to the second photoelectric detector by the second fiber coupler to form a reference signal; and determining displacement information of the object to be measured according to the measurement signal and the reference signal.

It should be noted that embodiments of the heterodyne fiber interferometer displacement measuring method of the present disclosure can refer to the description in the embodiments of the heterodyne fiber interferometer displacement measuring system, and will not be repeated here.

According to the heterodyne fiber interferometer displacement measuring system and method provided by the present disclosure, the specially processed fiber ferrule is used to realize four-subdivision measurement, and the plano-convex lens is used to couple the secondary reflected light into the single mode fibers to realize the elimination of influences of the rotation of the object to be measured and the spot separation on measurement. Compared with conventionally enlarging the spot size to eliminate the influence of the rotation angle of the object to be measured, the small spot of the measuring system has a smaller dead range error and reduces the influence of air disturbance on measuring optical wavefront. In addition, by setting a reference axis, the fiber optic perturbation error can be compensated, and the measuring system can have a smaller volume and a wider range of application scenarios by utilizing fiber optic transmission and a small number of optical components.

According to the present disclosure, the heterodyne fiber interferometer displacement measuring system and method have the advantages of insensitivity to the environment, high measurement accuracy, small size, light weight, large measurement range of rotation angle and large displacement measurement stroke, and when used as a position measuring system for ultra-precision workpiece stage of lithography machine, the comprehensive performance of the workpiece stage can be improved.

The heterodyne fiber interferometer displacement measuring system and method according to the present disclosure are described above by way of example with reference to the accompanying drawings. However, those skilled in the art should understand that various improvements can be made to the heterodyne fiber interferometer displacement measuring system and method proposed in the present disclosure above without departing from the content of the present disclosure. Therefore, the protection scope of the present disclosure should be determined by the contents of the appended claims.

What is claimed is:

1. A heterodyne fiber interferometer displacement measuring system, comprising:
   a laser light source assembly configured to simultaneously emit measuring light and reference light;
   a first photoelectric detector, a first fiber coupler, a fiber ferrule, a plano-convex lens, a first polarizing beam splitting prism, and a first reflecting device which are sequentially provided on an optical path of the measuring light on the basis of first single mode fibers; and
   a second photoelectric detector, a second fiber coupler, a collimator, a second polarizing beam splitting prism, and a second reflecting device which are sequentially provided on an optical path of the reference light on the basis of second single mode fibers;
   wherein an object to be measured is fixed on the first reflecting device;
   wherein the measuring light sequentially passes through the fiber ferrule, the plano-convex lens and the first polarizing beam splitting prism to form two beams of light, one of which is fed back to the first fiber coupler via the first reflecting device, the first polarizing beam splitting prism, the plano-convex lens, the fiber ferrule and the first single mode fibers and the other of which is fed back to the second fiber coupler via the second polarizing beam splitting prism, the collimator and the second single mode fibers;

wherein the reference light sequentially passes through the collimator and the second polarizing beam splitting prism to form two beams of light, one of which is fed back to the second fiber coupler via the second reflecting device, the second polarizing beam splitting prism, the collimator and the second single mode fibers and the other of which is fed back to the first fiber coupler via the first polarizing beam splitting prism, the plano-convex lens and the first single mode fibers;

wherein the first fiber coupler couples the processed measuring light and reference light to the first photoelectric detector to form a measurement signal; and the second fiber coupler couples the processed reference light and measuring light to the second photoelectric detector to form a reference signal; and wherein displacement information of the object is determined according to the measurement signal and the reference signal.

2. The heterodyne fiber interferometer displacement measuring system of claim 1, wherein the laser light source assembly comprises a single-frequency laser, an fiber beam splitter connected to the single-frequency laser, and a first acousto-optic modulator and a second acousto-optic modulator connected to the fiber beam splitter, and wherein a light beam emitted by the single-frequency laser passes through the fiber beam splitter to form two beams of light, one of which is frequency-shifted by the first acousto-optic modulator to form the measuring light and the other of which is frequency-shifted by the second acousto-optic modulator to form the reference light.

3. The heterodyne fiber interferometer displacement measuring system of claim 1, wherein the laser light source assembly comprises a first laser emitter and a second laser emitter, and wherein the first laser emitter emits the measuring light, and the second laser emitter emits the reference light having the same frequency as the measuring light.

4. The heterodyne fiber interferometer displacement measuring system of claim 1, wherein the reference light passes through the second single mode fibers and is processed by the collimator to form a first linearly polarized light with a polarization angle of 45°, wherein the first linearly polarized light passes through the second polarizing beam splitting prism to form a first P light and a first S light, and the first P light is projected to the second reflecting device and returns to the collimator and the second single mode fibers, and wherein the first S light is reflected to the first polarizing beam splitting prism and then converged by the plano-convex lens to the first single mode fibers.

5. The heterodyne fiber interferometer displacement measuring system of claim 4, wherein the measuring light passes through the first single mode fibers and then passes through the plano-convex lens to form a second linearly polarized light with a polarization angle of 45°, wherein the second linearly polarized light passes through the first polarizing beam splitting prism to form a second P light and a second S light, and the second S light is reflected to the second polarizing beam splitting prism and then enters the second single mode fibers through the collimator, wherein a projected light beam (1.1) of the second P light reaches the first reflecting device, and then a reflected light beam (1.2) is projected to an end surface of the fiber ferrule after passing through the plano-convex lens, and then is reflected to the plano-convex lens, wherein a light beam (1.3) having passed through the plano-convex lens again is parallel to the light beam (1.2), and a light beam (1.4) obtained by reflecting the light beam (1.3) by the first reflecting device is parallel to the light beam (1.1), and wherein the light beam (1.4) is converged into the first single mode fibers after passing through the plano-convex lens.

6. The heterodyne fiber interferometer displacement measuring system of claim 5, wherein the light beam (1.4) and the first S light having entered the first single mode fibers are transmitted to the first fiber coupler, and are coupled to the first photoelectric detector through the first fiber coupler, wherein the first photoelectric detector forms the measurement signal according to the processed measuring light and reference light, and wherein the second S light and the first P light having entered the second single mode fibers are transmitted to the second fiber coupler, and are coupled to the second photoelectric detector through the second fiber coupler, wherein the second photoelectric detector forms the reference signal according to the processed measuring light and reference light.

7. The heterodyne fiber interferometer displacement measuring system of claim 1, wherein the displacement information of the first reflecting device is expressed by a formula as below:

$$\Delta z = \frac{\lambda(\varphi_1 - \varphi_2)}{2\pi \times 2\left(1 + \frac{1}{\cos\theta}\right)}$$

wherein $\Delta z$ represents the displacement information, $\lambda$ represents a wavelength of the light beam in the air, $\varphi_1$ represents a discriminated phase with the measurement signal, $\varphi_2$ represents a discriminated phase with the reference signal, and $\theta$ represents an installation angle of the first reflecting device relative to a y-axis direction.

8. The heterodyne fiber interferometer displacement measuring system of claim 7, wherein the discriminated phase with the reference signal is formed based on a perturbation error of the first single mode fibers and the second single mode fibers, and wherein the perturbation error is removed by a subtraction method.

9. The heterodyne fiber interferometer displacement measuring system of claim 1, wherein the first reflecting device is a mirror or a grating.

10. A heterodyne fiber interferometer displacement measuring method, in which the heterodyne fiber interferometer displacement measuring system of claim 1 is used to measure displacement of an object to be measured, the method comprising:

emitting a measuring light and a reference light by a laser light source assembly;

sequentially passing the measuring light through the fiber ferrule, the plano-convex lens and the first polarizing beam splitting prism to form two beams of light, one of which is fed back to the first fiber coupler via the first reflecting device, the first polarizing beam splitting prism, the plano-convex lens, the fiber ferrule and the first single mode fibers, and the other of which is fed back to the second fiber coupler via the second polarizing beam splitting prism, the collimator and the second single mode fibers, and at the same time, sequentially passing the reference light through the collimator and the second polarizing beam splitting prism to form two beams of light, one of which is fed back to the second fiber coupler via the second reflecting device, the second polarizing beam splitting prism, the collimator and the second single mode fibers, and the other of which is fed back to the first fiber coupler via the first polarizing beam splitting prism, the plano-convex lens and the first single mode fibers; and determining displacement information of the object to be measured according to the measurement signal and the reference signal.

* * * * *